A. L. STEVENS.
APPARATUS FOR AND PROCESS OF PURIFYING GAS.
APPLICATION FILED SEPT. 22, 1919.

1,423,696.

Patented July 25, 1922.
2 SHEETS—SHEET 1.

Inventor
Arthur L. Stevens
By
Barnett Numan
Attorneys.

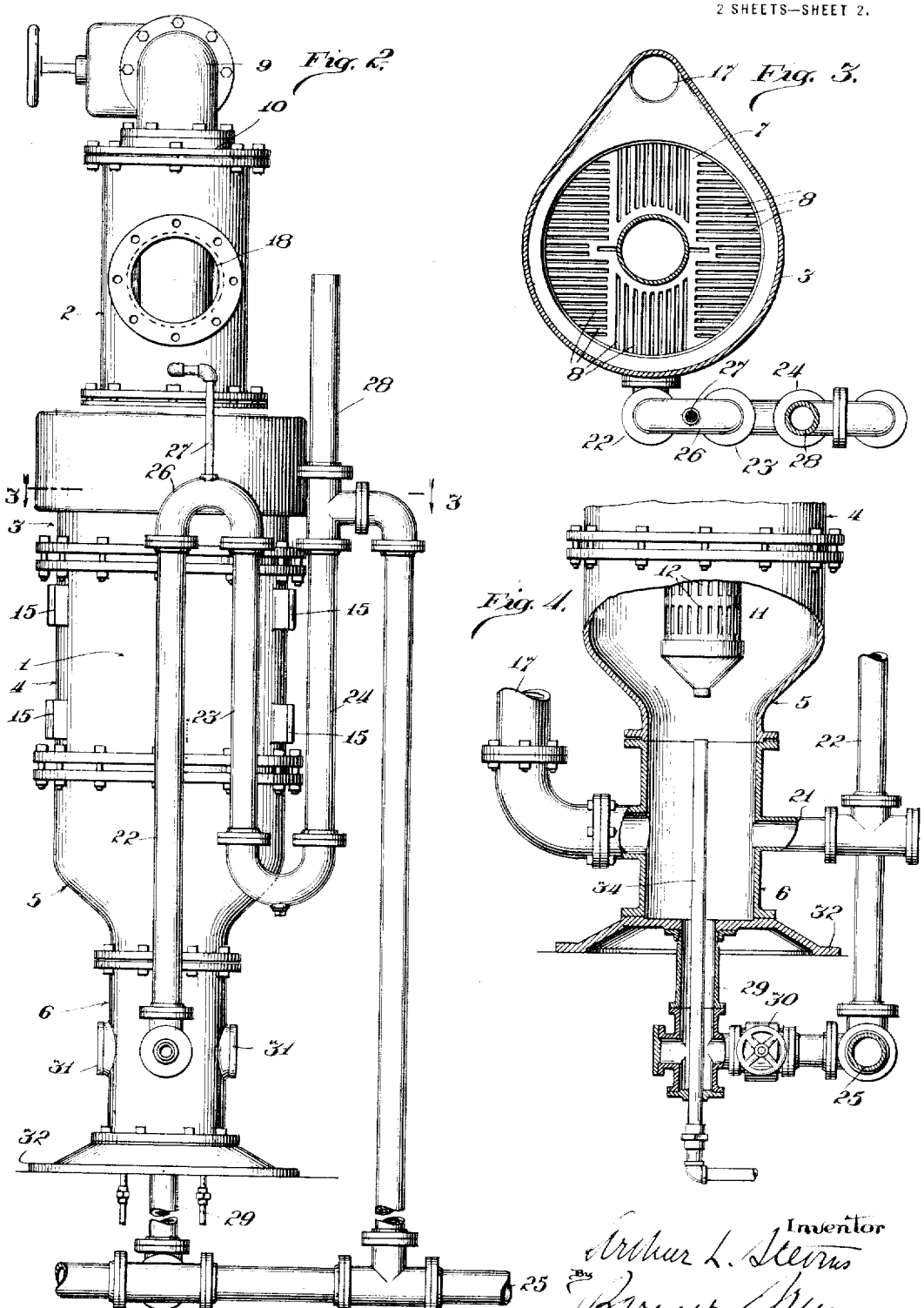

UNITED STATES PATENT OFFICE.

ARTHUR L. STEVENS, OF CHICAGO, ILLINOIS.

APPARATUS FOR AND PROCESS OF PURIFYING GAS.

1,423,696.  Specification of Letters Patent.  Patented July 25, 1922.

Application filed September 22, 1919. Serial No. 325,442.

*To all whom it may concern:*

Be it known that I, ARTHUR L. STEVENS, a citizen of the United States, residing at Chicago, in the county of Cook and State of Illinois, have invented certain new and useful Improvements in Apparatus for and Processes of Purifying Gas, of which the following is a specification.

My invention relates to an apparatus for and method of purifying gas, particularly coal gas.

In the manufacture of coal gas the gas from the retort is passed through scrubbers which remove a large portion of the impurities from the gas, which scrubbers, however, fail to remove minute particles of foreign matter, for example, tar, which may exist in the gas in the form of a vapor or fog and pass along with it from the scrubber. The scrubbers commonly employed are also incapable of eliminating from the gas such substances for example as sulphur and carbon dioxide.

It has been found that when gas containing tar in a fog or vapor is passed through a body of hot liquid tar, the tar in the gas will have an affinity for or tendency to adhere to the body of tar through which the gas is passed. It has also been found that sulphur and carbon dioxide may be eliminated from gas by passing the gas through a body of absorbing liquid, for example, lime water. In order to eliminate effectively any of these undesirable substances, it is essential that the gas be brought into very intimate contact with the body of liquid through which it is passed. One of the objects of my invention is to provide an improved apparatus whereby the gas will be very finely subdivided and brought into intimate contact with the liquid through which it is passed, tar, lime water, or other cleansing fluid; and to this end I provide an aggregation of relatively small bodies, preferably spherical and of smooth surface, which are submerged in the liquid and are supported by suitable means, for example, grates or perforated plates through which the gas is compelled to pass. Thus the gas in passing through the grates or perforated plates is divided into small streams and in passing through the tortuous paths constituted by the spherical bodies or balls, is further subdivided still more minutely. By this means every particle of the gas is brought into intimate contact with the liquid, and the elimination of the undesirable constituents in the gas is completely effected.

A further object of my invention is to provide improved means for the circulation of the body of liquid through which the gas is passed, which comprises a by-pass pipe in association with the reservoir containing the liquid, the pressure maintained in the by-pass pipe being sufficient to compel the gas to pass through the portion of the body of liquid in which the balls are arranged.

The invention consists in the novel and improved constructions, arrangements and devices to be hereinafter described and claimed for carrying out the above stated objects and such other objects as will hereinafter appear.

The invention is illustrated in certain preferred embodiments in the accompanying drawings, wherein:

Fig. 2 is a side elevational view of the apparatus;

Fig. 3 is a horizontal section on the line 3—3 of Fig. 2; and

Fig. 4 is a vertical sectional view illustrating a modified form of apparatus.

Like characters of reference designate like parts in the several figures of the drawing.

Figure 1:
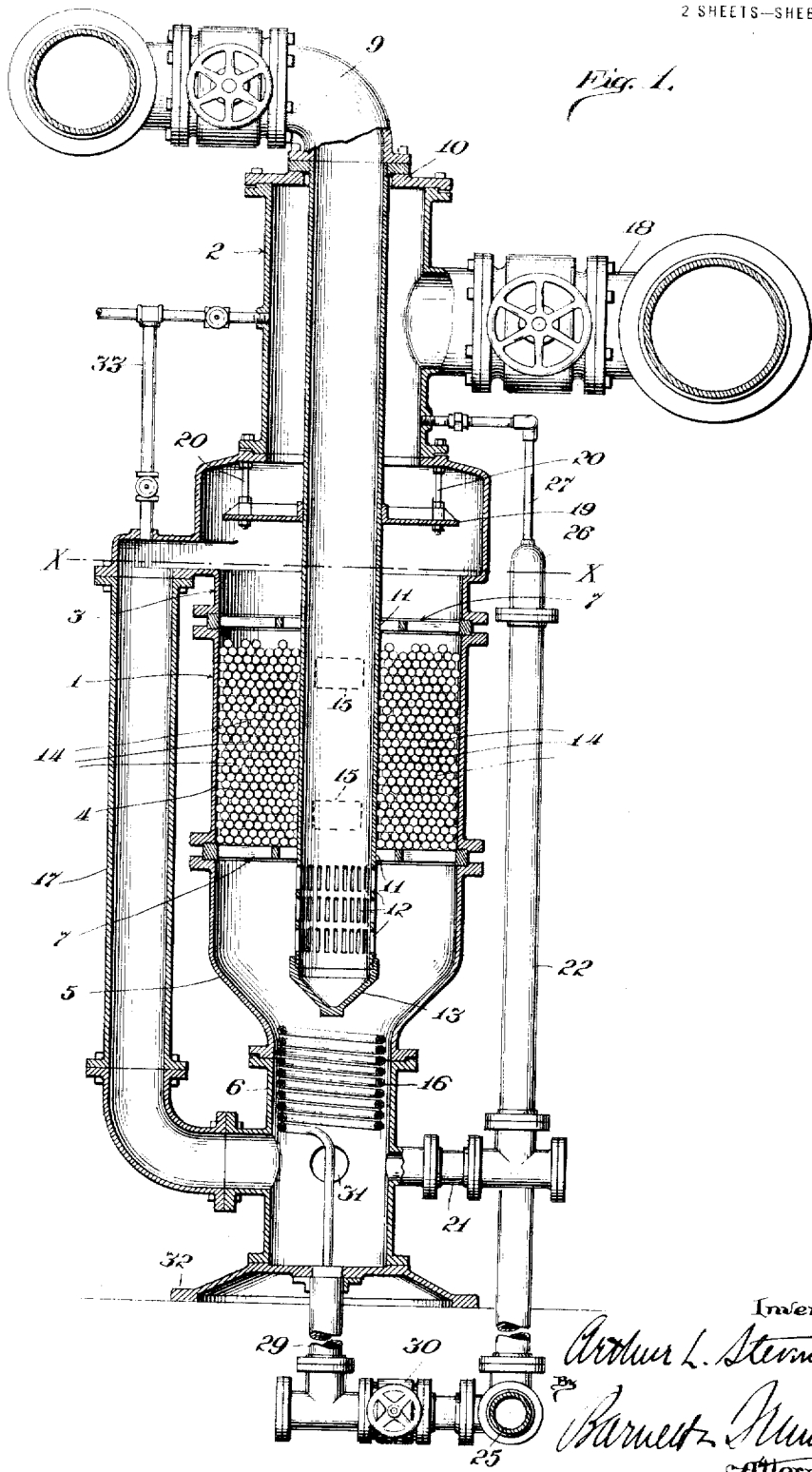
Fig. 1 is a vertical sectional view of an apparatus embodying the principles of my invention.

In Figs. 1 to 3 inclusive of the drawing, I have shown a novel form of apparatus in which the operation of removing tar may be practiced and in which 1 is a cylindrical casing built up of sections, 2, 3, 4, 5 and 6. The casing may be formed of cast iron or any other suitable material. Between the sections 3 and 4 and 4 and 5 I interpose grates or perforated plates 7, shown in detail in Fig. 3, which are preferably formed with a series of narrow slots 8. The grates or perforated plates 7 are held in place by any suitable means, preferably by clamping them between the adjacent flanges of the sections 3 and 4 and 4 and 5, respectively.

Gas is forced from the ordinary scrubber, in which a considerable portion of the impurities have been removed, and the gas cooled incidentally in the scrubbing operation, into the apparatus as here shown through the main 9 which passes into the top 10 of the apparatus and through the openings 11 formed in the grates 7. The lower end of the gas main or conduit 9 is formed with a plurality of orifices, preferably narrow vertical slots 12, and the bottom of the pipe is closed by means of the cap 13. By this arrangement the gas is forced out through the slots 12 in radial jets, and then upwardly through the grates 7. A number of relatively small bodies or objects 14, preferably spherical and smooth of surface, and uniform in size, are placed in the reservoir between the grates 7, 7 in the reservoir around the gas conduit, hand holes 15 being formed in the casing for the insertion of the same. The bodies 14 may be of any suitable material. I have found that glass balls approximately one inch in diameter are particularly desirable for the purpose, although other objects such as shot or gravel might also be used, but perhaps to less advantage. A heating coil 16 may be provided for maintaining the tar in a fluid state.

The reservoir is filled to the level X, X, with a liquid which, for the removal of tar fog from gas will preferably be a body of tar. A by-pass or return pipe 17 is provided in association with the reservoir to provide for the circulation of the tar in the vessel set up by the rising of the gas through the body of tar and also in some degree by the rising of the heated tar in the heater 16. The introduction of the gas into the vessel at the point above that at which the lower end of the return pipe 17 enters the vessel prevents the passing of any gas upwardly through the return pipe.

At the top of the apparatus is provided a discharge main 18. In order to prevent carrying over large globules of tar into the discharge main, due to the rush of gas through the body of tar, I provide a horizontal baffle member 19 which is suspended around the inflow pipe by means of threaded studs 20, the upper ends of which are screwed into the flanges formed on the sections 2 and 3. Any tar which splashes against the bottom of the baffle member drops back into the apparatus, the gas being forced around the edges of the baffle member.

I provide means for maintaining the level of tar constant on the line X, X, regardless of any variations in the gas pressure. The excess tar removed from the gas may pass out of the apparatus at the bottom through the pipe 21 and through the legs 22, 23 and 24, and finally to a main 25 leading to a suitable reservoir. In order that no siphonic action should occur, I place at the bend 26 in the pipe a small pipe 27 leading into the upper part of the casing to break the vacuum at this point. The pipe 27 also serves to equalize the pressure in the bend 26 with the pressure inside the casing. In order that the difference between the internal gas pressure and atmospheric pressure may not lower the level below the line X, X by forcing liquid tar out of the apparatus, I provide the additional stand pipe 28 for balancing this pressure, this pipe being open at the top to the atmosphere. The differential in hydrostatic pressure in pipes 23 and 24 is equal to the pressure at which the gas is delivered through the main 18. As a result of this the liquid in the reservoir is maintained at a constant level, even when varying pressures are employed in the gas main. I provide the apparatus with a drain 29 for removing the liquid tar from the casing controlled by a valve 30, and which is connected to the pipe 25. Additional hand holes 31 are provided at convenient points in the sides of the apparatus for cleaning purposes. The apparatus rests on the base 32. A pipe 33 may be provided for blowing out the apparatus in cleaning.

The gas is forced into the apparatus through the main 9 and on passing through the slots 12 it is forced outwardly in radial jets and is uniformly distributed underneath the lower grate 7. It is then forced upwardly through this grate against the hydrostatic head of liquid tar. In passing through the grate 7 it is divided into small streams and forced to take the tortuous paths between the balls 14, thereby being further subdivided into streams, and the minute particles of tar suspended in the gas are brought into very intimate relationship with each other and with the body of liquid tar in the reservoir.

In Fig. 4 I have illustrated a modified form of apparatus which may be used for recovering benzol, which is valuable as a by-product, or for eliminating sulphur from the gas. The apparatus is substantially the same as has been heretofore described. If it is desired to eliminate sulphur from the gas, limewater may be employed in the same way as the liquid tar is employed in removing the tar fog from the gas. The limewater may be introduced into the apparatus through the pipe 34. It will also be evident that this form of apparatus may be used for recovering benzol from the gas. For this purpose tar distillate, which has an affinity for benzol, may be introduced into the apparatus by means of the pipe 34.

I have found that the efficiency of the apparatus does not depend upon the velocity of the gas through the liquid, as equally good results may be obtained when the pressure of the gas is relatively low, as when it is relatively high, because of the minute streams the gas is subdivided into and the tortuous paths, they are forced to travel in passing through the aggregate of small bodies.

It will be observed that I have provided an apparatus, simple in construction, without moving parts, adapted for continuous operation, with all outlets other than the discharge main, sealed at all times against the escape of gas, and with provision for continuous circulation of the liquid contents within a closed path through the casing and by-pass, with automatically maintained liquid level by automatic discharge of any increase of the volume of liquid by virtue of impurities separated from the gas.

When liquid tar is used as described, the circulation provided serves not only to facilitate the passage of the gas through the tar and through the minute and numerous passages between the glass balls or the like, but, with the heating coil in service, such circulation serves to keep the entire body of tar sufficiently fluid and to permit and assist the gas to flow throughout the entire mass of glass balls or the like instead of establishing relatively limited and definite lines of flow through only a portion of the mass of balls. This also neutralizes any tendency of the tar to gum or close certain of the passages between such bodies as the glass balls, and overcomes the tendency of the gas to force out or carry away the tar from the interstices between the small balls as might happen without means providing for a constant circulation and supply of tar.

When other liquids are used, such as lime water or other liquids which differ from the impurities in the gas for which they have an affinity, such circulation tends to produce a more homogeneous condition whereby the whole body of liquid continues to act efficiently until the point of saturation or near saturation is reached.

It will be apparent to those skilled in the art that the apparatus is capable of various modifications in the matter of details of construction and arrangement of parts, and I do not limit the invention to the details of construction and arrangements described except only in so far as certain of the appended claims are so limited.

The word "affinity" as employed in certain of the claims is used in a broad sense to intend, for example, either a cohesive or reactive affinity as between the impurities in the gas and the body of liquid through which the gas is passed.

I claim:

1. A gas purifying apparatus comprising in combination a reservoir for containing a purifying liquid, a by-pass pipe connected with said reservoir at an upper and lower level, a gas supply conduit discharging into said reservoir at an intermediate level, a grate in said reservoir above the discharge end of said supply pipe, a body of small objects of a configuration to provide voids between them supported by said grate for subdividing the gas into minute streams, and a gas discharge conduit connected with said reservoir for conducting away the cleaned gas.

2. A gas purifying apparatus comprising in combination a reservoir for containing a purifying liquid, a by-pass pipe connected with said reservoir at an upper and lower level, a gas supply conduit discharging into said reservoir at an intermediate level, a pair of grates in said reservoir above the discharge end of said supply pipe, a body of smooth, small objects supported between said grates for subdividing the gas into minute streams, and a gas discharge conduit connected with said reservoir for conducting away the cleaned gas.

3. A gas purifying apparatus comprising in combination a reservoir for containing a purifying liquid, a by-pass pipe connected with said reservoir at an upper and lower level, a gas supply conduit leading to an intermediate level and provided with a plurality of vertical slots for discharging the gas in lateral streams into said reservoir, a body of smooth spherical objects in said liquid through which the gas is adapted to pass for dividing said gas into a plurality of small streams, and a gas discharge conduit connected with said reservoir for conducting away the cleaned gas.

4. A gas purifying apparatus comprising in combination a reservoir for containing a purifying liquid, a by-pass pipe connected with said reservoir at an upper and lower level, a gas supply conduit leading to an intermediate level, said conduit being closed at the end and provided with a plurality of vertical slots adjacent said end whereby the gas is discharged laterally into the liquid in said reservoir, a body of smooth, small objects supported in said liquid above the discharge end of said supply pipe for dividing the gas into minute streams and bringing the same into intimate contact with the liquid, and a gas discharge conduit connected with the upper portion of said reservoir for conducting away the cleaned gas.

5. A gas purifying apparatus comprising in combination a reservoir for containing a purifying liquid, a gas supply conduit for discharging gas into said liquid, a body of small objects in said reservoir for subdividing the gas into minute streams, and means for maintaining a constant liquid level in said reservoir and for conducting away excess liquid comprising a pipe connected with the lower portion of said reservoir and extending upwardly to a point coinciding with the liquid level in said reservoir and connected to said reservoir above said liquid level, said pipe running straight downwardly and upwardly to form a U-shaped section and terminating at a point above the liquid level, and provided with an outlet in the terminal portion of said U-section at a point below the liquid level.

6. A gas purifying apparatus comprising in combination a reservoir containing liquid tar, means for maintaining said tar at a constant level, a by-pass pipe connected with said reservoir at the upper level of said tar and with the lower portion of said reservoir, a gas supply conduit discharging into said tar, a body of objects of a configuration to provide voids between them which are in said tar for dividing said gas into minute streams and bringing the same into intimate contact with said tar, and a gas discharge conduit connected with said reservoir for conducting away the cleaned gas.

7. A gas purifying apparatus comprising in combination a reservoir containing liquid tar, means for maintaining said tar at a constant level, a by-pass pipe connected with said reservoir at the upper level of said tar and with the lower portion of said reservoir, a gas supply conduit discharging into said tar, a body of objects of a configuration to provide voids between them which are in said tar for dividing said gas into minute streams and bringing the same into intimate contact with said tar, and a heater in the lower portion of said reservoir for maintaining the tar at the proper fluidity, and a gas discharge conduit connected with said reservoir for conducting away the cleaned gas.

8. A gas purifying apparatus comprising in combination a reservoir containing liquid tar, means for maintaining a constant level of tar, and for conducting away excess tar, a by-pass pipe connected with the reservoir at the upper level of said tar, and with the lower portion of said reservoir, a gas supply pipe extending from the upper portion of said reservoir centrally thereof, and terminating at a point above the lower connection of said by-pass pipe, a grate across said reservoir above the discharge end of said supply pipe, a body of small objects of a configuration to provide voids between them which are in the tar supported by said grate for dividing the gas into minute streams and bringing the same into intimate contact with said tar, a heater in the lower portion of said reservoir for maintaining the tar at the proper fluidity, and a gas discharge conduit connected with the upper portion of said reservoir for conducting away the cleaned gas.

9. Apparatus for removing the residual tar fog from gas comprising a chamber for containing a liquid having an affinity for the particles of tar in the gas, a conduit for introducing the gas into said chamber so as to pass through the liquid, a body of small objects in said liquid adapted to break up the gas passing through the liquid into a plurality of small streams and to repeatedly change the direction of such streams, and a discharge conduit connected with said chamber for conducting away the cleaned gas.

10. Apparatus for removing the residual tar from gas comprising a chamber for containing liquid tar, a conduit for introducing the gas into said chamber so as to pass through said tar, a body of small, smooth, spherical objects in said tar adapted to break up the gas passing through the tar into a plurality of small streams and to repeatedly change the direction of such streams, and a discharge conduit connected with said chamber for conducting away the cleaned gas.

11. A gas cleaning apparatus comprising in combination, a vessel containing a body of liquid having an affinity for the impurities suspended in the gas, a mass of small solids of a configuration to provide voids between them which are supported midway in the vessel and submerged in the liquid, means for introducing the gas into the body of liquid below said mass of small solids, and a return by-pass for conducting the liquid from a point above the mass of small solids to the portion of the liquid below said mass and below the point of entrance of the gas.

12. A gas cleaning apparatus comprising, in combination, a vessel containing a body of liquid having an affinity for the impurities suspended in the gas, a mass of small solids of a configuration to provide voids between them which are supported midway in the vessel and submerged in the liquid, means for introducing the gas into the body of liquid below said mass of small solids, a return by-pass for conducting the liquid from a point above the mass of small solids to the portion of the liquid below said mass and below the point of entrance of the gas, and means for automatically discharging the excess liquid as augmented by the impurities of the gas so as to maintain said body of liquid at a constant level.

13. A gas cleaning apparatus comprising, in combination, a vessel containing a body of liquid having an affinity for the impurities suspended in the gas, a grid extending across the vessel above the point and within the body of liquid, a mass of small solids of a configuration to provide voids between them which are supported on said grid and within the liquid, a gas pipe extending through said mass of small solids and through the grid for introducing the gas into the body of liquid below said grid, and a return by-pass for conducting liquid from a point above the mass of small solids to the portion of the liquid below said mass and below the point of entrance of the gas.

14. Method of removing minute tar particles from gas which consists in producing a continuous circulation of tar through the interstices of and then around a mass of small solids of a configuration providing voids between them, and introducing the gas into said stream of liquid at a point in advance of and adjacent to said mass.

15. Method of removing minute tar particles from gas which consists in producing a continuous circulation of tar first upwardly through the interstices of and then downwardly around a mass of small solids of a configuration providing voids between them, and introducing gas into the rising stream of tar at a point above the lowest point of the stream and below said mass of solids.

16. Method of removing minute tar particles from gas which consists in producing a continuous circulation of tar first upwardly through the interstices of and then downwardly around a mass of small solids of a configuration providing voids between them, introducing gas into the rising stream of tar at a point above the lowest point of the stream and below said mass of solids, and discharging the tar from said body as the body is augmented by accretions of tar particles from the gas.

ARTHUR L. STEVENS.

Certificate of Correction.

It is hereby certified that in Letters Patent No. 1,423,696, granted July 25, 1922, upon the application of Arthur L. Stevens, of Chicago, Illinois, for an improvement in "Apparatus for and Processes of Purifying Gas." an error appears in the printed specification requiring correction as follows: Page 3, line 72, claim 2, strike out the word "smooth", and after the word "objects" insert the words *of a configuration to provide voids between them;* and that the said Letters Patent should be read with this correction therein that the same may conform to the record of the case in the Patent Office.

Signed and sealed this 9th day of January, A. D., 1923.

[SEAL.] KARL FENNING,
*Acting Commissioner of Patents.*